April 21, 1931.  W. H. LIVELY  1,802,211
EXTERMINATING MACHINE
Filed March 9, 1929  8 Sheets-Sheet 1
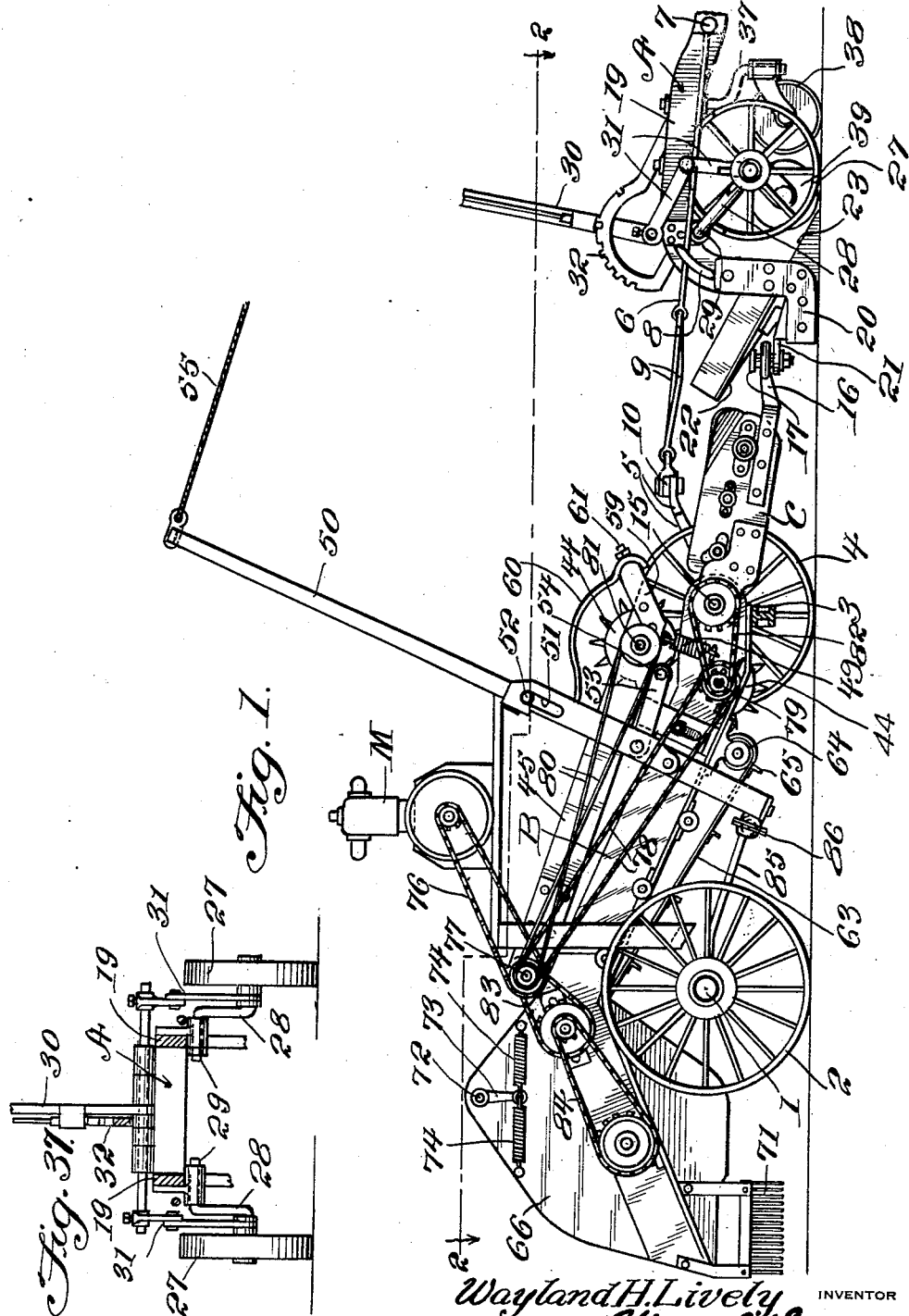

April 21, 1931.  W. H. LIVELY  1,802,211
EXTERMINATING MACHINE
Filed March 9, 1929   8 Sheets-Sheet 2
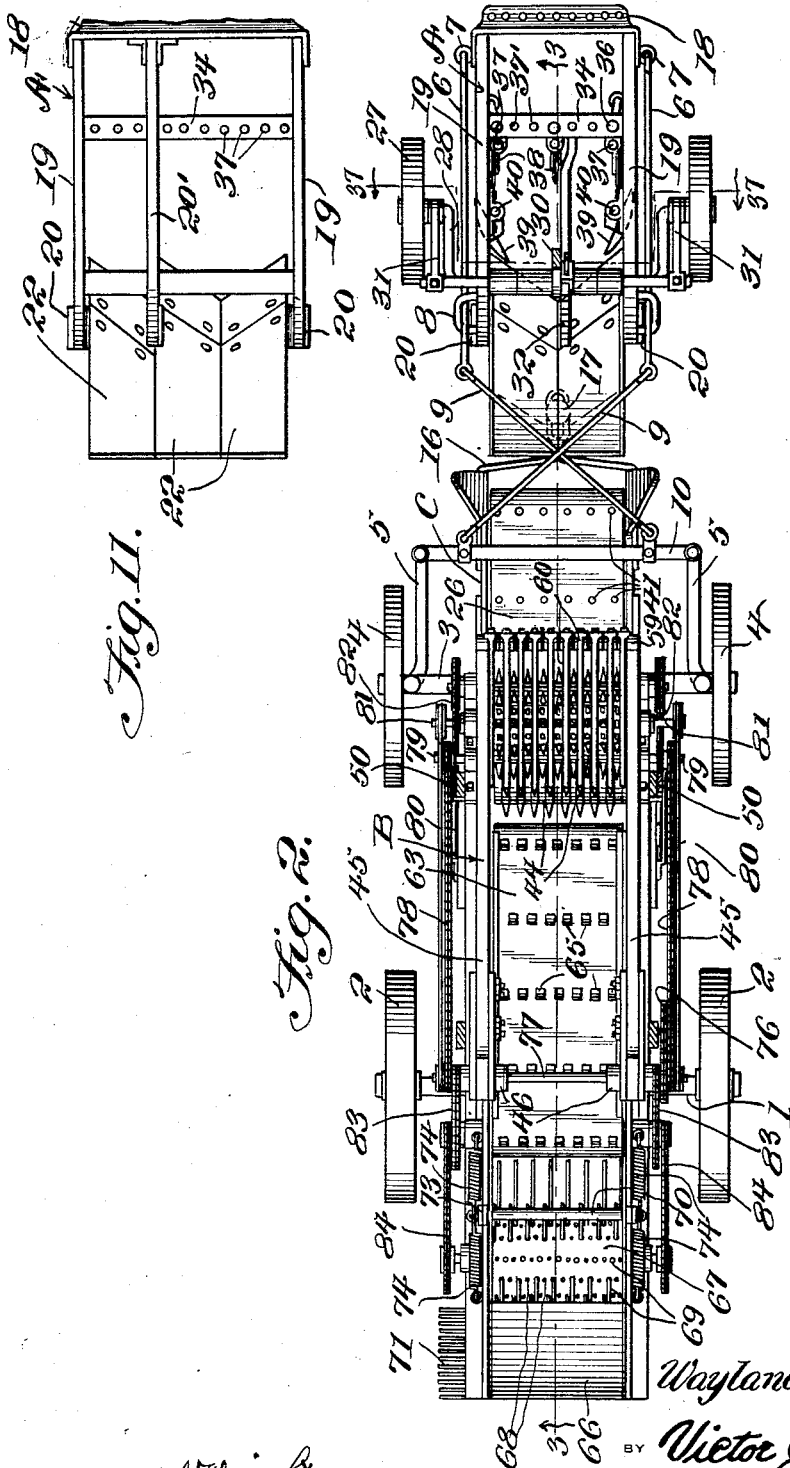

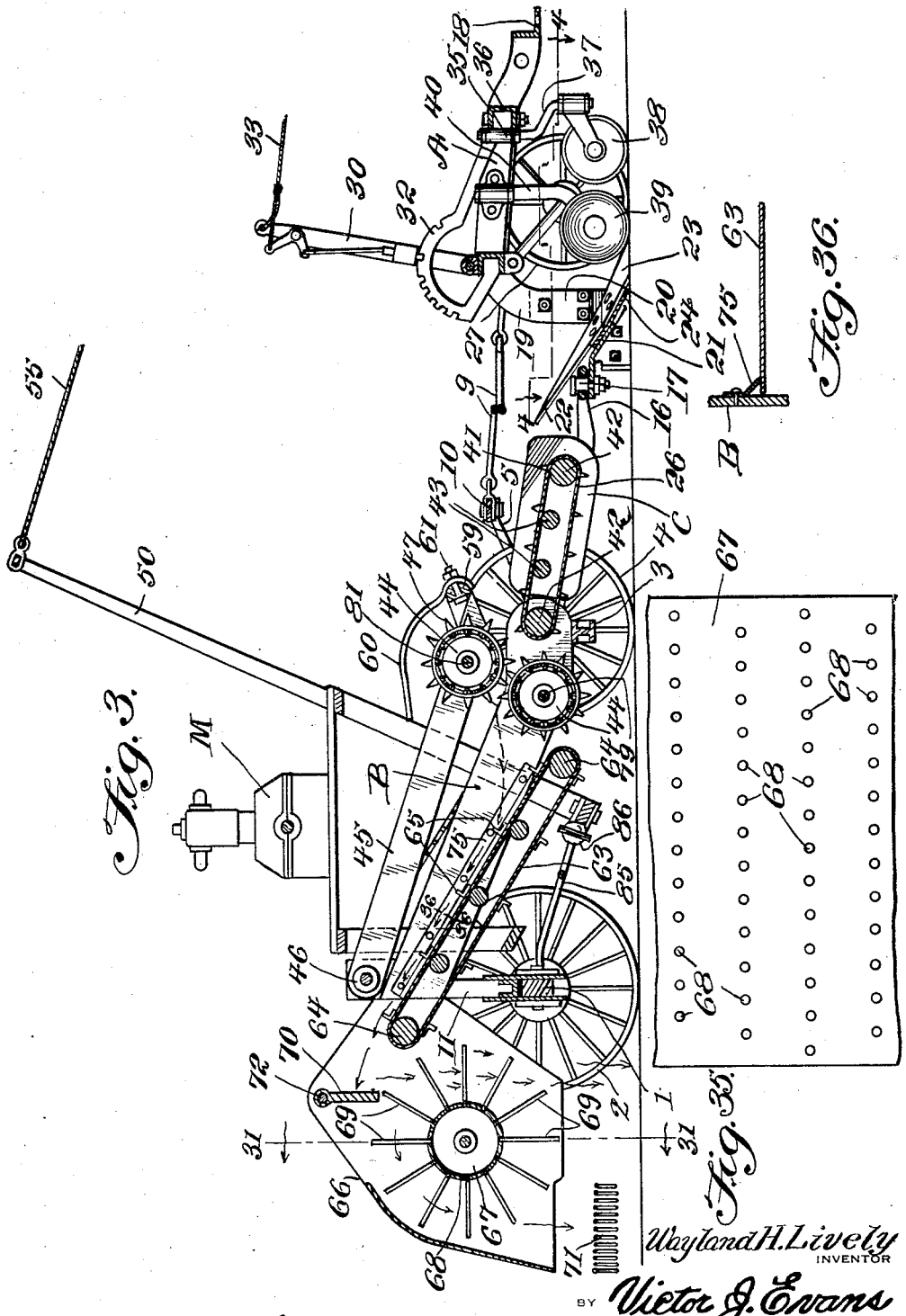

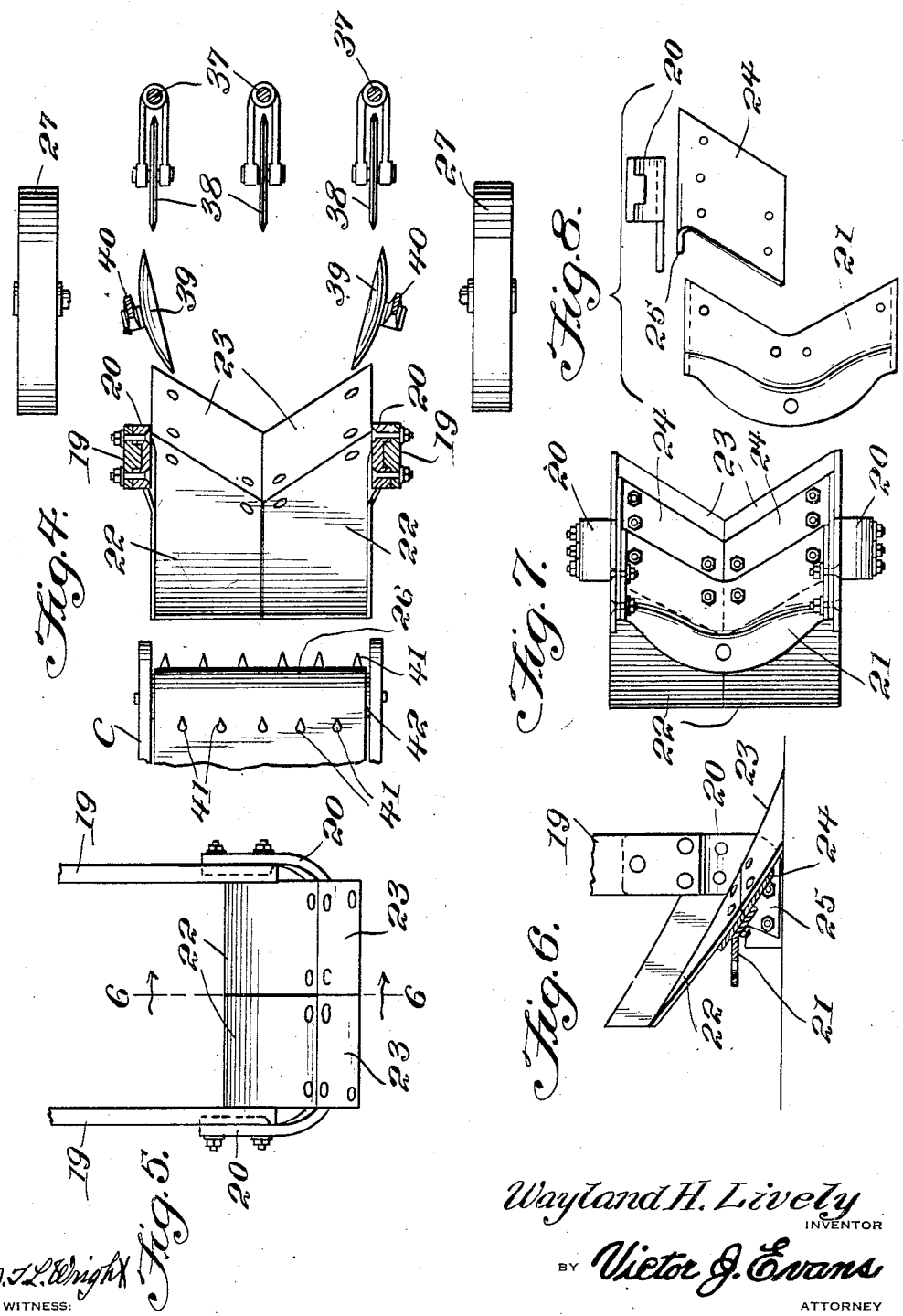

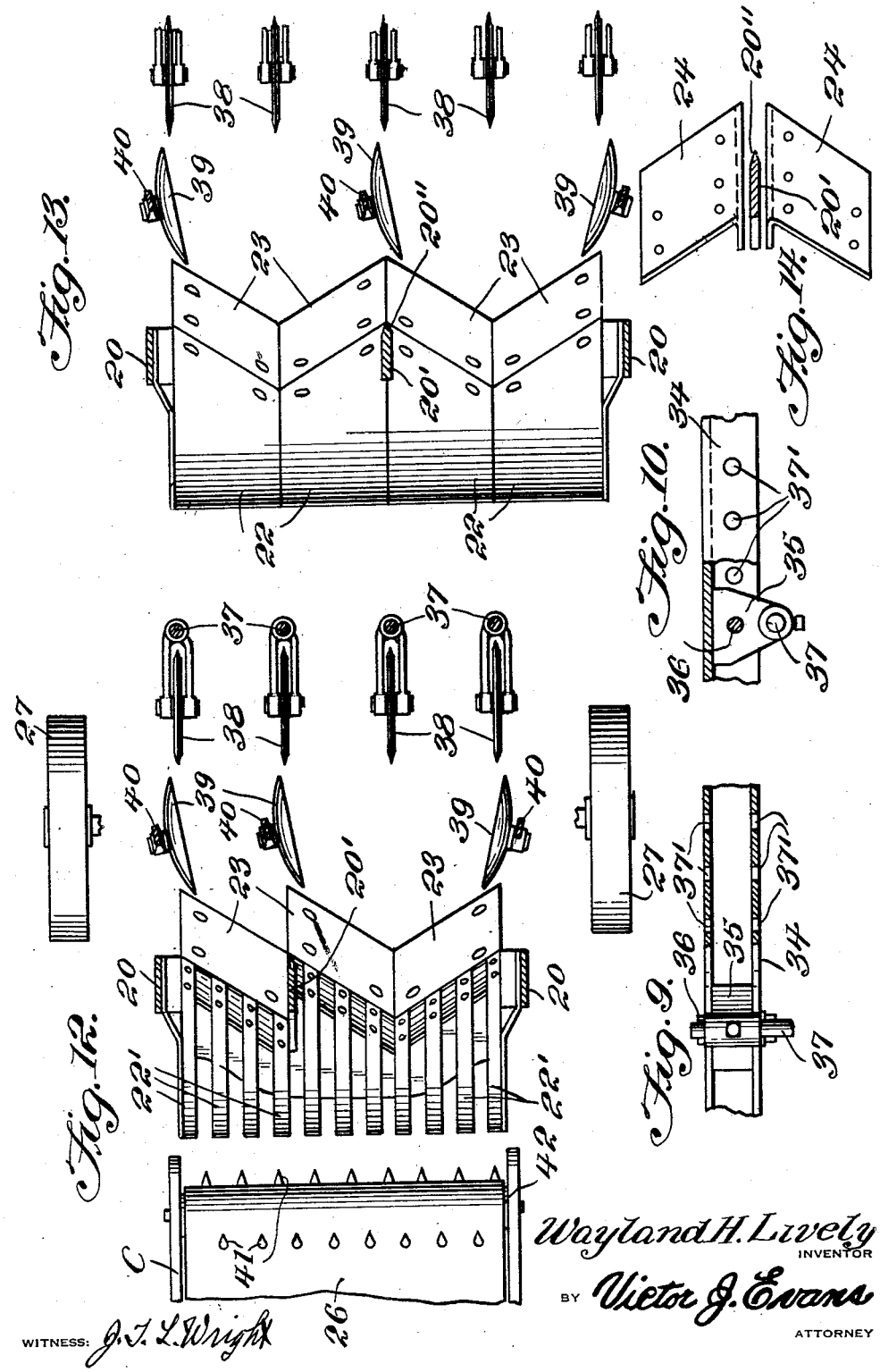

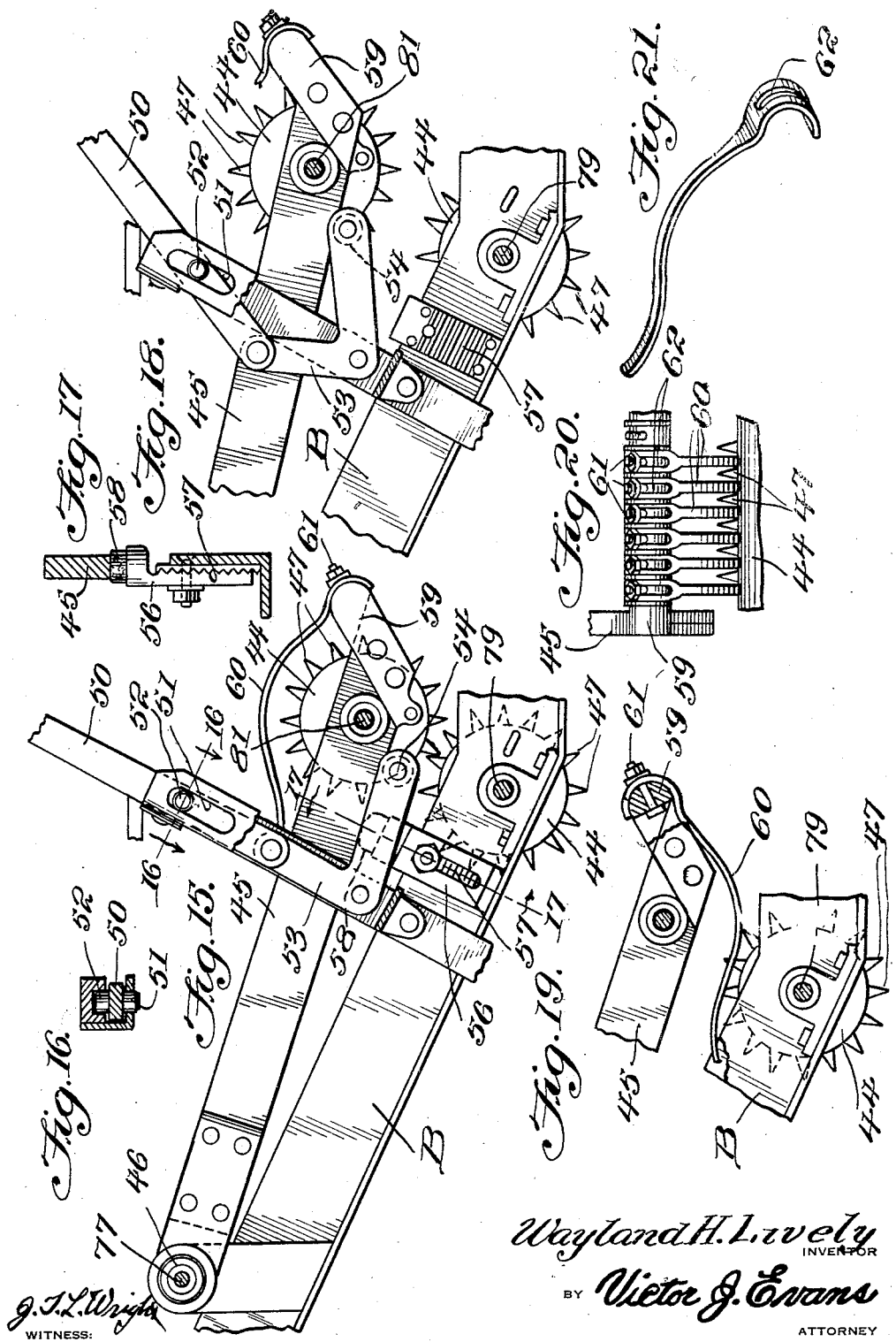

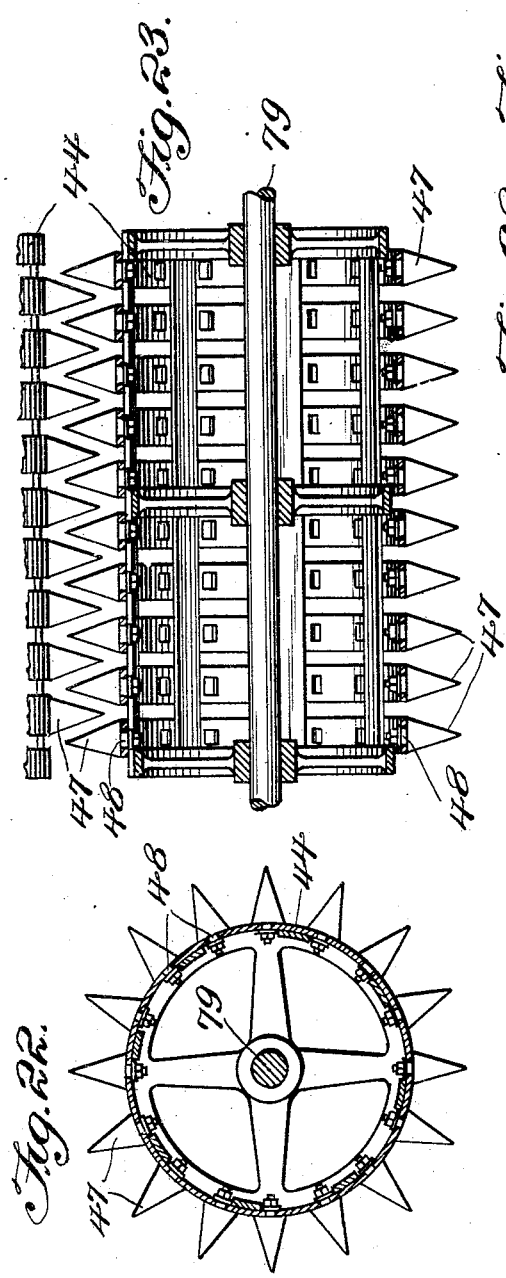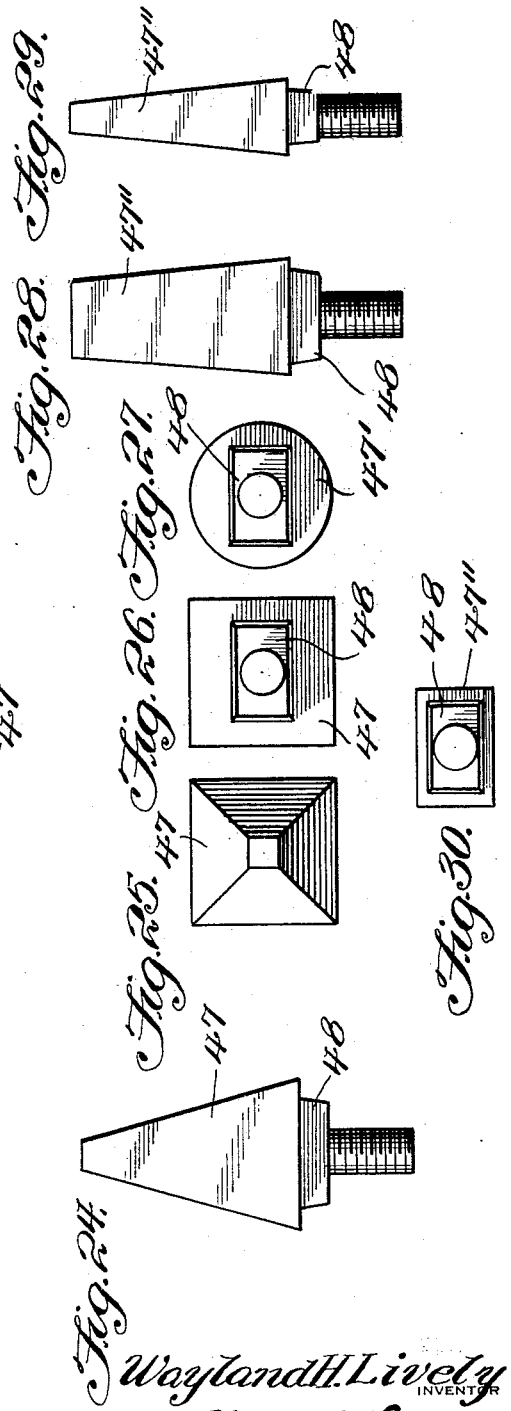

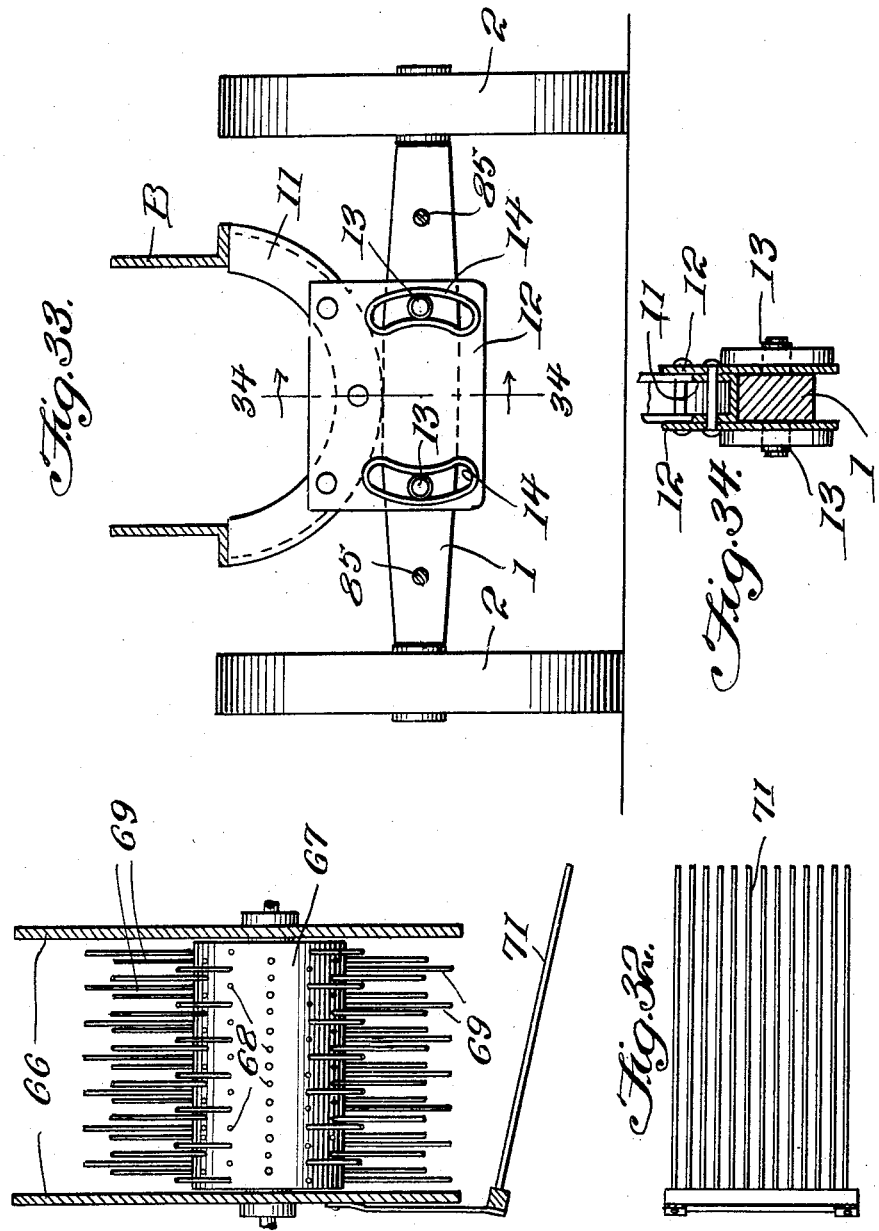

Patented Apr. 21, 1931

1,802,211

UNITED STATES PATENT OFFICE

WAYLAND H. LIVELY, OF BELTRAMI, MINNESOTA

EXTERMINATING MACHINE

Application filed March 9, 1929. Serial No. 345,715.

This invention relates to an agricultural implement for removing the roots of pestiferous plants from the soil, the general object of the invention being to provide a plow for raising a strip of earth containing the roots to a conveyor as the machine is traveling along, pulverizing means for receiving the material from the conveyor so that the soil is thoroughly pulverized, with separator means to which the earth and roots are brought from the pulverizing device and in which the roots are separated from the soil, the soil dropping back upon the surface over which the machine is passing and the roots being deposited to one side of the machine where they can be burned or otherwise exterminated. Thus the machine not only takes the roots from the soil, but leaves the soil in condition for planting.

Another object of the invention is to form the separating means in the form of a cylinder having a plurality of fingers projecting therefrom and between which the dirt drops under the action of gravity, while the upward movement of the fingers will cause the fingers to engage the roots and thus separate them from the dirt, the roots being thrown off the fingers by centrifugal force if they should tend to stick to the fingers.

Another object of the invention is to provide means for adjusting the various parts so that the machine can be adjusted to suit the soil being worked and the amount of roots in the soil.

A further object of the invention is to provide means whereby the parts can be controlled from a tractor which pulls the machine, with means for driving the conveyors, the pulverizers and the separating means from a motor on the main frame of the apparatus.

A further object of the invention is to so construct and arrange the parts that the main frame will not be subjected to strain when the machine is being used in rough ground and to provide means whereby the plow part and the pulverizer and separator carrying part will readily follow the tractor, with the pulverizer and separator carrying part automatically steered from the plow carrying part.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of the apparatus.

Figure 2 is a section on line 2—2 of Figure 1.

Figure 3 is a section on line 3—3 of Figure 2.

Figure 4 is a section on line 4—4 of Figure 3.

Figure 5 is a front view of the plow.

Figure 6 is a section on line 6—6 of Figure 5.

Figure 7 is a bottom plan view of the plow.

Figure 8 is a view showing details of various parts of the plow.

Figure 9 is a view, partly in section, showing the means for adjustably connecting a coulter stem with the supporting bar.

Figure 10 is a fragmentary plan view, with parts in section, of such means.

Figure 11 is a top plan view of a plow provided with three beams and three sections.

Figure 12 is a top plan view with parts in section, showing a three-section plow with its disks and coulters and with the mold boards formed of spaced strips.

Figure 13 is a top plan view, with parts in section, showing a four-section plow.

Figure 14 is a detail view of a pair of frogs and a beam to which the frogs are connected.

Figure 15 is an elevation showing the supporting means for the crusher cylinders and the means for adjusting the top cylinder toward and away from the lower cylinder, this view also showing guard fingers extending over the upper cylinder.

Figure 16 is a section on line 16—16 of Figure 15.

Figure 17 is a section on line 17—17 of Figure 15.

Figure 18 is a view showing the supporting means for the upper cylinder in raised position.

Figure 19 is a view showing the upper cylinder removed and the guard fingers reversed to cooperate with the lower cylinder to crush the dirt passing between the fingers and cylinder.

Figure 20 is a fragmentary front view of Figure 19.

Figure 21 is a view of one of the fingers.

Figure 22 is a transverse sectional view through one of the cylinders.

Figure 23 is a longitudinal sectional view through one of the cylinders and showing how the teeth of one cylinder pass through the spaces between the teeth of the other cylinders.

Figure 24 is an elevation of one of the teeth.

Figure 25 is a top plan view of said tooth.

Figure 26 is a bottom plan view thereof.

Figure 27 is a bottom plan view of a round tooth.

Figure 28 is a view of a modified form of tooth.

Figure 29 is an edge view of said tooth.

Figure 30 is a bottom plan view of said tooth.

Figure 31 is a section on line 31—31 of Figure 3.

Figure 32 is a top plan view of the grate for receiving the roots from the separator cylinder.

Figure 33 is a view showing how the main frame which carries the crusher and separator means is supported from the rear axle.

Figure 34 is a section on line 34—34 of Figure 33.

Figure 35 is a diagrammatic view showing the arrangement of holes in the separator cylinder for receiving the separator teeth.

Figure 36 is a section on line 36—36 of Figure 3.

Figure 37 is a section on line 37—37 of Figure 2.

In these drawings, the letter A indicates the plow frame and B the frame which supports the crushing and separating means, this latter frame being supported at its rear on the rear axle 1 which carries the rear wheels 2 and said frame is supported at its front on the axle 3 which has the front wheels 4 pivotally connected with its ends so that the frame is guided by the steering movement of such wheels 4. The steering movement is communicated to the arms 5 of the wheel spindles from the plow frame through means of the rods 6 attached one to each side of the plow frame, as shown at 7, with the rear portions of the rods passing through the guides 8 and the rear portions of the plow frame, and the rear ends of the rods being connected to the cross bars 9 which have their rear ends connected with a connecting rod 10 which connects the arms 5 together. Thus turning movement of the plow frame will be communicated to the frame B as the device travels along. The frame B is connected with the rear axle 1 by the semi-circular part 11 attached to the main frame, with its lower central part attached to a pair of spaced plates 12 which embrace the axle 1 and are movably connected with the axle by the rollers 13 attached to the axle by bolts and engaging arc-shaped slots 14 in the plates. Thus the frame B will ride evenly while the rear wheels are traveling over rough ground so that the frame is not wrenched or damaged.

The front end of the frame B carries a conveyor frame C which is pivotally connected with the front end of the frame B, as shown at 15, so that the conveyor frame can move about a horizontal axis which is substantially in the plane of steering movement of the front wheels, and a slotted coupling 16 is connected with the front end of the conveyor frame C and loosely fits a coupling bolt 17 at the rear of the plow frame, the coupling having both turning and vertical movement on the bolt so that the frame B can readily follow the frame A, it being understood that the pulling strain between the frames A and B comes on the connections 6, 9, 10 and 5 and not on this coupling.

The plow frame A has a long horizontally arranged clevis 18 at its front for receiving the draft means, this clevis having a plurality of holes therein so that the plow frame can be suitably adjusted to the tractor or other draft means. The plow frame includes the side pieces 19 which constitute the beams, these pieces curving downwardly at their rear ends, and the foot pieces 20 are bolted to these rear ends, these pieces extending toward each other, as shown in Figure 5, and being connected together by the bridge piece 21. The upper ends of the foot pieces are ribbed to fit in grooves in the beams, as shown in Figures 4 and 5, so that there is no danger of the foot pieces turning in the beams and by curving the lower portions of the foot pieces inwardly, the dirt, as it passes up the plow, is prevented from contacting the beams.

Each mold board 22 and its share 23 are bolted to a frog 24 and the flange 25 of each frog is fastened to a foot piece 20, the bolts which connect the mold boards and shares to the frogs also passing through the bridge piece. Thus it will be seen that the plow comprises a pair of mold boards and their shares and the parts are so constructed and arranged that the two shares form a flat V in cross section, with their cutting edges extending inwardly from the outer side of each share to its inner side. Thus as the apparatus travels along, the plow picks up a strip of earth and the earth passes up the plow and passes over the rear end of the two mold boards and falls upon the conveyor 26 in the frame C. The plow frame A is supported by the wheels 27 which are carried by the crank arms 28 of the sectional shaft 29, the sections of the two shafts being suitably connected with the frame so that they can be adjusted to place one wheel in a lower plane than the other, if necessary, due to the contour of the ground on which the device is used. The two parts of the shafts are moved in unison to raise or lower the wheels through means of a lever 30 pivotally arranged in the frame and connected with the shaft by a link 31 so that by adjusting the lever on a quadrant 32, the wheels can be adjusted to control the depth at which the plow enters the ground. A cable 33 leads from the lever to the tractor or other draft means so that the operator thereof can operate the lever.

A cross piece 34 has its ends connected with the beams 19 adjacent the front of the frame, and this cross piece is of channel shape and slidingly receives a block 35 which can be fastened in adjusted position in the cross piece by a pin 36 passing through the block and through any one of a plurality of pairs of holes 37' in the cross piece. A plurality of these blocks may be used and they support in an adjustable manner the shanks 37 of the coulters 38. Figure 4 shows three coulters being used, a pair of the coulters cutting the strip to be lifted by the plow and the center coulter cutting the strip in half so that the two halves can be readily lifted by the two sets of mold boards and their shares, as clearly shown in Figure 4. A disk plow 39 has its shank 40 connected to each beam or side piece 19 and these disks are arranged as shown in Figure 4, so that they will move the soil inwardly at the side edges of the plow so that the plow can readily pick up the strip without the outer edges of the plow digging into the soil.

From the foregoing it will be seen that the plow device will first cut a strip of soil by the coulters, the strip being cut in half by the center coulter and then the outer edges of the strip are turned inwardly by the disks and finally the plow picks up the strip and carries it rearwardly and discharges it on to the conveyor 26 in the frame C. As before stated, the depth at which the plow penetrates the soil can be regulated so that the plow will pick up the soil containing all the roots or the major portion of the roots.

The conveyor 26 comprises an endless belt containing the spikes or projections 41 and passing over the front and rear rollers 42 and the intermediate guiding rollers 43, and this conveyor delivers the soil containing the roots between the lower and upper crusher cylinders 44, the axle of the lower cylinder being journaled in a stationary part of the frame and the axle of the upper cylinder being journaled in the bars 45 which are pivoted at their rear ends to an upright part of the frame, as shown at 46. The upper cylinder is placed slightly in advance of the lower cylinder and each cylinder is provided with a plurality of rows of holes for receiving the shanks of the teeth 47, the shanks being threaded to receive nuts so that the teeth are removably connected to the cylinders. By arranging the teeth in annular rows and properly positioning the teeth of one cylinder with respect to the teeth of the other cylinder, the teeth of one cylinder will pass through the spaces between the rows of teeth of the other cylinder, as shown in Figure 23, so that the dirt or soil is thoroughly crushed as it passes between the cylinders. This manner of fastening the teeth in the cylinders also permits the number of teeth used in each cylinder to be varied, as desired, to suit different conditions of the soil. It also enables different kinds of teeth to be used to suit the soil being handled. For instance, Figures 24, 25 and 26 show a tooth 47 of substantially pyramidal form, with a rectangular base 48 for fitting in a rectangular hole in the cylinder, while Figure 27 shows a tooth 47' of circular shape in cross section. Figures 28, 29 and 30 show a tooth 47'' of tapered formation with flat sides and of considerable width, but of less thickness. All of the teeth are provided with the same shape of base and with a threaded shank.

Springs 49 connect the lower ends of the bars 45 with parts of the frame and act to yieldingly hold the upper cylinder toward the lower cylinder, thus enabling stones, rocks or unbreakable material to pass through the cylinders by lifting the upper one without damaging the parts. However, if the operator sees a large rock or the like will pass through the device, he can swing the upper cylinder upwardly by lifting the bars 45 through means of a pair of levers 50 connected to an upright part of the frame by pin and slot connections 50 which include anti-friction means 52, each lever having its lower end connected to a bell crank 53 which carries a roller 54 engaging one of the bars 45. Thus by moving the levers, which are connected together, by means of a cable 55, from the position shown in Figure 15 to the position shown in Figure 18, the bell crank will be tilted to move the bars 45 upwardly and thus shift the upper cylinder away from the lower cylinder and thus permit the rock or the like to pass between the cylinders.

In order to prevent the teeth of one cylinder from contacting the teeth of the other cylinder, I provide adjustable stops 56 which are adjustably connected with parts of the frame, as shown at 57, which have blocks 58 of resilient material or the like on their upper ends for engaging the bars 45 and thus limit the downward movement of such bars.

An upwardly and forwardly extending head 59 is connected with the free ends of the bars 45, the upper edge of this head being of curved shape so as to receive the hooked or curved ends of the guard fingers 60 which are adjustably connected with the head by the bolts 61 passing through slots 62 in the hooked ends of the fingers. These fingers will extend over the upper cylinder and act as a guard therefor, but when the apparatus is used in rocky ground and it is not desirable to use the upper cylinder, this upper cylinder can be removed and the guards placed in the position they occupy in Figure 19, so that portions of the guards will extend over the lower cylinder and thus cooperate with the same to crush the soil passing over said lower cylinder. The crushed soil and the roots pass from the crusher cylinders on to an inclined conveyor 63 supported by the upper and lower rolls 64 journaled in the frame B, and the material is conveyed upwardly and rearwardly by this conveyor and its cross pieces 65 into a casing 66 supported at the rear of the frame B and containing a cylinder 67 having a plurality of rows of holes 68 therein for receiving the spring fingers 69. A swinging baffle member 70 is arranged in the upper part of the casing and the material leaving the conveyor 63 strikes this baffle member and then drops upon the fingers 69 of the cylinder 67, which are moving upwardly, and as the dirt is in a pulverized condition, it will readily pass between the fingers, though the fingers will engage the roots and carry the roots upwardly with them as the cylinder revolves. As the fingers move downwardly, the roots will drop from the same and this action is increased by centrifugal force and as the roots pass from the casing, they are caught by an inclined grate or chute 71 down which the roots slide until they fall off the end of the same which delivers the roots at one side of the machine. The shaft 72, which supports the member 70, extends through the sides of the casing and has an arm 73 attached to each end thereof and oppositely arranged springs 74 have their inner ends connected with each arm and the outer ends with parts of the casing. These springs tend to hold the member 70 in a vertical position, but permits it to have swinging movement under the force of the material striking the same.

As shown in Figure 36, flaps 75 are fastened to the walls of the frame of the conveyor 63 and overlap the edges of the conveyor 63 so as to keep the material from contacting the edge and falling over the same and this flap acts to keep the material from wearing the edges of the conveyor.

A motor M is mounted on the frame B and is connected by the chain and sprockets 76 with a shaft 77 which may form the pivotal connection of the bars 45 with the frame. Chains and sprockets 78 connect the shaft 77 with the pintles 79 of the lower crusher cylinder and pulleys and belts 80 connect the shaft 77 with the pintles 81 of the upper cylinder, these belts being crossed, as shown. By providing belts instead of chains, if rocks or the like should be passing between the cylinders, the upper cylinder can slip to permit the rocks to pass through without damage to the parts.

Chains and sprockets 82 connect the pintles 79 with the pintles of the rear roller 42 of the conveyor 26 in frame C and chains and sprockets 83 connect the shaft 77 with the upper roll 64 of the conveyor 63. Chains and sprockets 84 connect the pintles of said roll 64 with the pintles of the finger carrying cylinder 67. Thus all the movable parts of the apparatus are operated from the motor and the arrangement is such that the conveyor 26 moves the material received from the plow at about the same speed as the material is delivered by the plow on to said conveyor. The pulverizing cylinders operate at a faster speed than the conveyor 26 and the conveyor 63 operates at considerable speed so that there is but a thin layer of material on said conveyor and the separator cylinder operates at sufficient speed to remove all roots from the material as it drops through the separator casing.

Figure 12 shows the plow as consisting of three sections, that is, three mold boards with a share for each board, and this figure shows four coulters used for cutting the strip to be lifted by the plow into three sections, with a disk arranged at the outer edge of each section of the plow and this figure also shows the mold boards as composed of separated strips 22'.

Figure 13 shows a plow composed of four sections, with five coulters and three disks arranged in front of the plow.

Of course, extra beams 20' must be used when the plow is widened, as shown in Figures 12 and 13, to support the extra frogs, and these extra beams have their front edges sharpened, as shown at 20''.

The lower part of the frame B is connected with the axle 1 by the rods 85 containing the universal joints 86.

From the foregoing it will be seen that as the apparatus travels along, the coulters cut the soil which is impregnated with the roots, into a strip or strips and the disks make a small furrow at each edge of the strip so that the plow can readily lift the strip as its exterior parts do not have to cut the roots separating the strip from the rest of the soil. The strip passes up the plow and drops on to the conveyor 26 which conveys it to the pulverizing or crushing cylinders, where the soil is thoroughly pulverized to remove all clods, lumps or the like and thus the soil is thoroughly separated from the roots. The pulverized soil and roots are then carried upwardly by the conveyor 63 which discharges the material against the yieldable baffle 70 which in turn acts to cause the material to drop downwardly under the action of gravity through the separator casing 66 and as the material passes through the casing, the upwardly moving fingers 69 on the cylinder 67 remove the roots from the soil, the soil dropping back upon the surface and the roots being carried around with the fingers and finally dropped upon the grate 71, which deposits the roots upon the ground to one side of the machine. As before stated, the number of fingers used on the cylinder 67 can be adjusted to suit the conditions under which the apparatus is working. For instance, if the soil has a small number of roots therein, the number of fingers would be increased, but if the soil contains a comparatively large number of roots, some of the fingers can be removed. The teeth in the pulverizing cylinders can also be increased or decreased according to the condition of soil and various kinds of teeth can be used to suit the soil conditions. The space between the cylinders can also be adjusted by adjusting the bumpers 56 and when the soil is very rocky, the upper cylinder can be removed and the fingers 60 used in its place. This upper cylinder and the fingers can be raised and lowered by the operator on the tractor or draft means when he sees a large rock or the like is about to pass through the device, so that the rock can pass through without damage to the parts, though most of the rocks and other obstructions can pass through without damage to the parts as the upper cylinder will rise against the action of its springs 47. The operator can also control the depth at which the plow penetrates the ground from his seat on the tractor and the plow can be adjusted to suit the contour of the ground by manually adjusting one wheel in relation to the other. The apparatus B will automatically follow turning movements of the plow apparatus, due to the steering connection between the two.

This apparatus will quickly and easily remove the roots of pestiferous plants from the soil, leaving the soil in a pulverized condition ready for planting.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An apparatus of the class described comprising a plow for lifting a strip of soil, pulverizing means, means for conveying the strip from the plow to the pulverizing means where the soil is pulverized, a conveyor for receiving the pulverized soil and roots from the pulverizing means, and means for receiving the material from the conveying means and separating the roots from the soil.

2. An apparatus of the class described comprising a plow for lifting a strip of soil, pulverizing means, means for conveying the strip from the plow to the pulverizing means where the soil is pulverized, a conveyor for receiving the pulverized soil and roots from the pulverizing means, a casing into which the conveyor discharges the soil and roots, a cylinder in the casing and a plurality of fingers carried by the cylinder and moving upwardly through the falling soil and roots for separating the roots from the soil.

3. An apparatus of the class described comprising a plow for lifting a strip of soil, pulverizing means, means for conveying the strip from the plow to the pulverizing means where the soil is pulverized, a conveyor for receiving the pulverized soil and roots from the pulverizing means, a casing into which the conveyor discharges the soil and roots, a cylinder in the casing, a plurality of fingers carried by the cylinder and moving upwardly through the falling soil and roots for separating the roots from the soil and a yieldably supported baffle in the casing against which the material from the conveyor discharges and which causes the material to drop through the casing.

4. An apparatus of the class described comprising a plow frame, a plow thereon for lifting a strip of dirt containing roots, a wheel supported frame, means for connecting said frame with the plow frame whereby the frame will follow the movements of the plow frame, a conveyor on the frame for receiving the strip of dirt from the plow, pulverizing cylinders carried by the frame and receiving the material from the conveyor whereby the dirt is pulverized, a casing in rear of the frame, a conveyor in the frame for conveying the material from the pulverizing cylinders into the casing, a yieldably supported baffle in the top of the casing against which the material strikes as it leaves the conveyor, said baffle causing the material to drop downwardly through the casing, a cylinder in the casing, a plurality of fingers thereon passing upwardly through the falling material for separating the roots from the pulverized dirt, a motor on the frame, means for driving the pulverizing cylinders, the two conveyors and the separator cylinder from said motor and a chute for receiving the roots from the separator cylinder and depositing them on the ground to one side of the apparatus.

5. An apparatus of the class described comprising a plow frame, a plow thereon for lifting a strip of dirt containing roots, a wheel supported frame, means for connecting said frame with the plow frame whereby the frame will follow the movements of the plow frame, a conveyor on the frame for receiving the strip of dirt from the plow, pulverizing cylinders carried by the frame and receiving the material from the conveyor whereby the dirt is pulverized, a casing in rear of the frame, a conveyor in the frame for conveying the material from the pulverizing cylinders into the casing, a yieldably supported baffle in the top of the casing against which the material strikes as it leaves the conveyor, said baffle causing the material to drop downwardly through the casing, a cylinder in the casing, a plurality of fingers thereon passing upwardly through the falling material for separting the roots from the pulverized dirt, a motor on the frame, means for driving the pulverizing cylinders, the two conveyors and the separator cylinder from said motor, a chute for receiving the roots from the separator cylinder and depositing them on the ground to one side of the apparatus, adjustable stop means for limiting the downward movement of the upper pulverizing cylinder and yieldable means for holding the cylinder against the stop means.

6. An apparatus of the class described comprising a plow frame, a plow thereon for lifting a strip of dirt containing roots, a wheel supported frame, means for connecting said frame with the plow frame whereby the frame will follow the movements of the plow frame, a conveyor on the frame for receiving the strip of dirt from the plow, upper and lower pulverizing cylinders carried by the frame and receiving the material from the conveyor whereby the dirt is pulverized, a casing in rear of the frame, a conveyor in the frame for conveying the material from the pulverizing cylinders into the casing, a yieldably supported baffle in the top of the casing against which the material strikes as it leaves the conveyor, said baffle causing the material to drop downwardly through the casing, a cylinder in the casing, a plurality of fingers thereon passing upwardly through the falling material for separating the roots from the pulverized dirt, a motor on the frame, means for driving the pulverizing cylinders, the two conveyors and the separator cylinder from said motor, a chute for receiving the roots from the separator cylinder and depositing them on the ground to one side of the apparatus, adjustable stop means for limiting the downward movement of the upper pulverizing cylinder, yieldable means for holding the upper pulverizing cylinder against the stop means and manually operated means for lifting the upper cylinder as the apparatus is traveling along.

7. An apparatus of the class described comprising a plow frame, a plow thereon for lifting a strip of dirt containing roots, a wheel supported frame, means for connecting said frame with the plow frame whereby the frame will follow the movements of the plow frame a conveyor on the frame for receiving the strip of dirt from the plow, upper and lower pulverizing cylinders carried by the frame and receiving the material from the conveyor whereby the dirt is pulverized, a casing in rear of the frame, a conveyor in the frame for conveying the material from the pulverizing cylinders into the casing, a yieldably supported baffle in the top of the casing against which the material strikes as it leaves the conveyor, said baffle causing the material to drop downwardly through the casing, a cylinder in the casing, a plurality of fingers thereon passing upwardly through the falling material for separating the roots from the pulverized dirt, a motor on the frame, means for driving the pulverizing cylinders, the two conveyors and the separator cylinder from said motor, a chute for receiving the roots from the separator cylinder and depositing them on the ground to one side of the apparatus, adjustable stop means for limiting the downward movement of the upper pulverizing cylinder, yieldable means for holding the said upper cylinder against the stop means, manually operated means for lifting the upper cylinder as the apparatus is traveling along, and reversible guard fingers for the upper cylinder, said fingers cooperating with the lower cylinder when reversed and the upper cylinder has been removed.

8. An apparatus of the class described comprising a plow frame, wheels for supporting the same, a plow carried by the frame for lifting a strip of soil containing roots, a second wheel supported frame, means for connecting the two frames together whereby the second frame will follow the movement of the first frame, a conveyor on the second frame receiving the strip of earth from the plow, a pair of pulverizing cylinders on the second frame receiving the strip from the conveyor fingers on said cylinder, a conveyor on the second frame receiving the pulverized dirt and the roots from the pulverizing means, a casing at the rear of the second frame into which the material is discharged by the second conveyor, a rotating cylinder in the casing, a plurality of fingers thereon moving upwardly through the falling material for separating the roots from the dirt, a yieldably supported baffle in the upper part of the casing against which the second conveyor discharges, a motor for driving the conveyors and the pulverizing and separating cylinders, means whereby the number of teeth on the pulverizing cylinders can be adjusted and means whereby the number of fingers on the separator cylinder can be adjusted.

9. An apparatus of the class described comprising a frame, pulverizing means therein, means for feeding soil containing roots to the pulverizing means, a casing carried by the frame, a horizontal cylinder therein having a plurality of spring fingers thereon, means for rotating the cylinder and means for feeding the pulverized earth and the roots into the casing above those fingers which are moving upwardly with the cylinder whereby the roots will be caught by said fingers and carried upwardly and the dirt will drop through the casing.

10. An apparatus of the class described comprising a frame, pulverizing means therein, means for feeding soil containing roots to the pulverizing means, a casing carried by the frame, a horizontal cylinder therein having a plurality of spring fingers thereon, means for rotating the cylinder, means for feeding the pulverized earth and the roots into the casing above those fingers which are moving upwardly with the cylinder whereby the roots will be caught by said fingers and carried upwardly and the dirt will drop through the casing, and a yieldably supported baffle in the upper part of the casing for receiving the material entering the casing and directing it downwardly upon the upwardly moving fingers.

11. An apparatus of the class described comprising a frame, upper and lower pulverizing cylinders therein, annular rows of teeth carried by each cylinder, means for adjustably and removably fastening the teeth to the cylinder, adjustable stop means for limiting the downward movement of the upper cylinder, means for yieldably holding the upper cylinder against the stop means, means for feeding soil containing roots to the cylinders, a casing carried by the frame, a cylinder therein, a plurality of spring fingers carried by the casing, means for rotating the cylinder and the pulverizing cylinders and means for conveying the material from the pulverizing cylinders into the upper part of the casing whereby the pulverized dirt and the roots will fall under the action of gravity upon the upwardly moving fingers and said fingers will separate the roots from the dirt.

12. An apparatus of the class described comprising a frame, upper and lower pulverizing cylinders therein, annular rows of teeth carried by each cylinder, means for adjustably and removably fastening the teeth to the cylinder, adjustable stop means for limiting the downward movement of the upper cylinder, means for yieldably holding the upper cylinder against the stop means, means for feeding soil containing roots to the cylinders, a casing carried by the frame, a horizontal cylinder therein, a plurality of spring fingers carried by the horizontal cylinder, means for rotating the horizontal cylinder and the pulverizing cylinders, means for conveying the material from the pulverizing cylinders into the upper part of the casing whereby the pulverized dirt and the roots will fall under the action of gravity upon the fingers of the horizontal cylinder and said fingers will separate the roots from the dirt, guard fingers for the upper pulverizing cylinder and means whereby said upper cylinder can be removed.

13. An apparatus of the class described comprising a wheel supported plow frame, a second frame supported by wheels connected with the plow frame, a plow carried by the plow frame and comprising a number of sections, each section consisting of a mold board and a share, each pair of shares being of V shape in horizontal section, disks carried by the plow frame for forming furrows at the outer edge of the plow, coulters carried by the plow frame in front of the disks for cutting the soil into strips before it is lifted by the plow, a conveyor on the second frame for receiving the material from the plow, pulverizing means on the second frame for receiving the material from the conveyor, a casing at the rear of the second frame, a conveyor on the second frame for conveying the material from the pulverizing means into the casing, a cylinder in the casing, a plurality of fingers thereon moving upwardly through the material falling from the conveyor whereby roots in the material are separated from the pulverized soil and means on the second frame for actuating the conveyors, the pulverizing means and the finger carrying cylinder.

14. An apparatus of the class described comprising a wheel supported plow frame, a second wheel supported frame, means for movably connecting the frames together, means whereby the second frame is caused to follow the movement of the first frame, a lifting plow carried by the plow frame for lifting a strip of soil, coulters and disks carried by the plow frame in front of the plow, means for adjusting the wheels of the plow frame from a distant point for controlling the depth of penetration of the plow, upper and lower pulverizing cylinders on the second frame, a conveyor on the second frame for conveying the soil from the plow between the pulverizing cylinders, means for yieldably holding the upper cylinder in its downward limit of movement, means for raising the upper cylinder from a distant point to permit obstructions to pass between the cylinders, a casing at the rear of the second frame, a conveyor for conveying the material from the pulverizing cylinders into the upper part of the casing, a cylinder in the casing, a plurality of fingers carried by the last mentioned cylinder for removing roots from the pulverized soil as the same drops through the casing, a yieldably supported baffle in the upper part of the casing against which the material from the conveyor discharges and is deflected downwardly, an inclined grate at the rear of the second frame for receiving the roots from the fingers and depositing them to one side of the apparatus, a motor on the apparatus and means for actuating the pulverizing cylinders, the conveyors and the finger carrying cylinder from said motor.

In testimony whereof I affix my signature.

WAYLAND H. LIVELY.